(12) United States Patent
Zaban et al.

(10) Patent No.: US 8,192,602 B2
(45) Date of Patent: Jun. 5, 2012

(54) METHOD FOR PREPARATION OF STABLE SOLUTIONS OF INORGANIC-ORGANIC POLYMERS

(75) Inventors: Arie Zaban, Shoham (IL); Larissa Grinis, Rishon Lezion (IL); Asher Ofir, Moshav Nehalim (IL)

(73) Assignee: 3GSolar Photovoltaics Ltd., Jerusalem (IL)

( * ) Notice: Subject to any disclaimer, the term of this patent is extended or adjusted under 35 U.S.C. 154(b) by 949 days.

(21) Appl. No.: 11/997,763

(22) PCT Filed: Aug. 3, 2006

(86) PCT No.: PCT/IL2006/000899
§ 371 (c)(1),
(2), (4) Date: Aug. 4, 2008

(87) PCT Pub. No.: WO2007/015249
PCT Pub. Date: Feb. 8, 2007

(65) Prior Publication Data
US 2009/0152115 A1    Jun. 18, 2009

Related U.S. Application Data

(60) Provisional application No. 60/705,180, filed on Aug. 4, 2005.

(51) Int. Cl.
*C25D 1/12* (2006.01)
*C25D 1/18* (2006.01)

(52) U.S. Cl. ........ 204/471; 204/478; 204/489; 204/490; 204/491; 204/507; 204/509

(58) Field of Classification Search ................. 204/471, 204/478, 489, 490, 491, 507, 509
See application file for complete search history.

(56) References Cited

OTHER PUBLICATIONS

Yoldas, B.E. Hydrolysis of Titanium Alkoxide and effects of hydrolytic polycondensation parameters; J. Material Science; 1986, vol. 21, pp. 1087-1092.*
Koura, N., Preparation of various oxide films by an electrophoretic deposition method; a stufy of the mechanism; J. Applied Physics, 1995, vol. 34, pp. 1643-1647.*

* cited by examiner

*Primary Examiner* — Bruce Bell
(74) *Attorney, Agent, or Firm* — Browdy and Neimark, PLLC

(57) ABSTRACT

The invention relates to a method for the preparation of stable solutions of charged inorganic-organic polymers, in which the hydrolysis-condensation reactions of metal alkoxides in alcoholic solutions are controlled using a condensation inhibitor that forms protons. The invention further relates to substrates coated by sol-gel electrophoretic deposition (EPD) with these solutions, and to metal oxide coated substrates obtained therefrom.

10 Claims, 1 Drawing Sheet

METHOD FOR PREPARATION OF STABLE SOLUTIONS OF INORGANIC-ORGANIC POLYMERS

FIELD OF INVENTION

The present invention relates to a method for preparation of stable solutions of charged inorganic-organic polymers from metal alkoxides.

BACKGROUND OF THE INVENTION

Nanostructured transparent conformal metal oxide coatings on different substrates have gained an increasing interest in many areas. Their applicability ranges from optics, electronics, solar energy conversion, and corrosion and abrasion protection to bioengineering.

Common methods for producing such coatings are dipping, spraying or spin coating by use of polymeric sols obtained via sol-gel technology. This well known technology is based on hydrolysis and poly-condensation of metal alkoxides. The chemistry involved in sol-gel process is based on inorganic polymerization (Yoldas, 1986; Kallala et al., 1992; Livage et al., 1988; Sanchez and Ribot, 1994). Hydrolysis and condensation reactions are both multiple-step processes, occurring sequentially and in parallel, and ultimately lead to the formation of oxopolymers. Non-silicate metal alkoxides such as those of transition metals, lanthanides, aluminium and tin are very sensitive to moisture (Livage et al., 1988; Sanchez and Ribot, 1994).

In order to obtain transparent sols, a control of hydrolysis and condensation is necessary. This control may be achieved through the use of inhibitors such as inorganic acids or complexing ligands like glycols, organic acids and β-diketones (Livage et al., 1988; Sanchez and Ribot, 1994). It is known that the simplest inhibitors for condensation reactions are protons ($H^+$ions) commonly supplied by inorganic acids such as hydrochloric acid or nitric acid (Yoldas, 1986; Kallala et al., 1992; Livage et al., 1988; Sanchez and Ribot, 1994).

The combination of iodine, acetone and water leads to the formation of free $H^+$ions according to the following reactions (Koura et al., 1995):

(1) $CH_3COCH_3 \leftrightarrow CH_3C(OH)CH_2$
(2) $CH_3C(OH)CH_2 + I_2 \rightarrow CH_3COCH_2I + H^+ + I^-$ The first reaction is a keto-enol equilibrium catalyzed by water and iodine, followed by the second reaction between enol-acetone and iodine giving $H^+$ions.

SUMMARY OF THE INVENTION

It has been found, in accordance with the present invention that, apparently, the hydrolysis-condensation reactions of metal alkoxides in an alcohol containing iodine, acetone and water as additives, proceed differently from the hydrolysis-condensation reactions in an alcohol containing the same quantity of water but without iodine and acetone.

Thus, the present invention relates to a method for the preparation of a stable solution of charged inorganic-organic polymers, comprising polymerization of at least one metal alkoxide by sol-gel technology in the presence of a condensation inhibitor that forms $H^+$ions, wherein said inhibitor consists of an alcoholic solution of the additives iodine, acetone and water.

DETAILED DESCRIPTION OF THE INVENTION

Figure 1A:
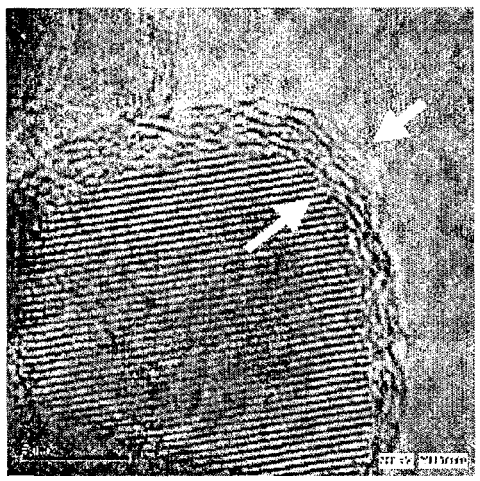
FIGS. 1A-1B show High Resolution Transmission Electron Microscopy (HRTEM) pictures of titania nanoparticles coated with $Ti(OiC_3H_7)_4$ (tetraisopropyl ortotitanate) sol-gel (1A) and with $Nb(OiC_3H_7)_5$ 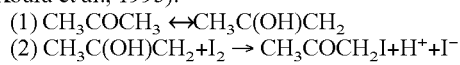 (niobium isopropoxide) sol-gel (1B), prepared according to the method of the present invention.
Figure 1B:
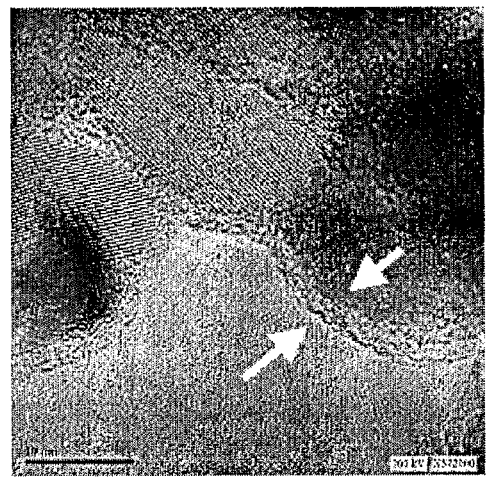

In one aspect, the present invention relates to a method for the preparation of a stable solution of charged inorganic-organic polymers by sol-gel technology, as defined herein, in which the hydrolysis and polycondensation reactions of metal alkoxides in alcoholic solutions are controlled using iodine, acetone and water as additives.

The metal alkoxide that can be used according to the present invention is an alkoxide of a metal selected from a lanthanide metal such as Ce, Pr, Nd, Pm, Sm, Eu, Gd, Tb, Dy, Ho, Er, Tm, Yb or Lu, a transition metal such as Sc, Ti, V, Cr, Mn, Fe, Co, Ni, Cu or Zn, an alkaline earth metal such as Be, Mg, Ca, Sr or Ba, an alkaline metal such as Li, Na, K, Rb or Cs, Al, or such an element as B, Si or P, and a $C_1$-$C_{10}$, preferably $C_1$-$C_6$, straight or branched alkanol including, without being limited to, methanol, ethanol, propanol, isopropanol, butanol, isobutanol, sec-butanol, tert-butanol, pentanol, neopentanol, sec-pentanol, hexanol and the like.

It is preferable for sol-gel application that the metal alkoxides be in liquid state rather than in solid state as in such case they are better soluble in non-aqueous media and may be easily dissolved in an organic solvent or organic solvents mixture. In general, metal alkoxides may be dissolved in organic solvents or organic solvents mixture. In order to dissolve the alkoxide, alcohols as well as other organic solvents, for example, hexane, toluene and others, can be used. Some of the commercial alkoxides are available in solution. For example, niobium isopropoxide from Alfa Aesar is a 10% w/v solution in isopropanol/hexane (50:50).

In preferred embodiments of the invention, the metal alkoxide is $Ti(OiC_3H_7)_4$, $Al(OsecC_4H_9)_3$, $Mg(OC_2H_5)_2$ or mixtures thereof.

The method of the present invention may also be used in order to obtain polymeric sols containing multicomponent oxide systems. These sols are produced by the hydrolysis and polycondensation of an alkoxide mixture with small quantities of the additives: iodine, acetone and water. In this case, the overall concentration of metal alkoxides will be the total value of all alkoxides within this mixture. In addition, considering that the hydrolysis rate of different metal alkoxides is different, mixing of metal alkoxides with alcoholic solution containing the above-mentioned additives has to be done, in general, not at the same time, but according to their reactivity.

The alcoholic solution used in the process of the present invention may be, without being limited to, composed of ethanol, isopropanol, isobutanol or mixtures thereof, and is preferably ethanol.

The additive iodine-acetone-water is particularly suitable for charging of the polymeric species in solution and subsequent sol-gel electrophoretic deposition (EPD). It is well known (Sarkar and Nicholson, 1996; Zhitomirsky, 2002) that besides particle charging, EPD requires a solution of low ionic strength and low conductivity, because increasing the ionic strength of solutions results in reduced thickness of the electrical double layer of particles, and in particle coagulation and sedimentation. The solutions made by the method of the present invention fulfill these requirements, thus, a low ionic strength and low conductivity solutions containing charged particles are achieved.

Additionally, for applications such as plastic-based optics, electronics and solar energy conversion cells it is important to minimize the contamination of final coatings with impurities that are non-volatile at low temperature processing. From this point of view, the use of alcoholic solutions with small amounts of volatile additives, namely, iodine, acetone and water, is significantly better than the commonly used acetylacetone, acetic acid or other similar substances, residues of which are difficult to remove even at high temperatures. It is worth noting that the above-mentioned commonly used substances involve capping by complexing ligands that inhibit the rearrangements and collapsing of the metaloxooligomers needed for the metal oxide formation and crystallization (Sanchez and Ribot, 1994).

The concentration of iodine, used as one of the additives in the alcoholic solution, is in the range of 0.005-0.25 g/l, preferably 0.06-0.15 g/l, most preferably 0.08-0.12 g/l, and the concentration of acetone, the second additive, is in the range of 0.5-200 ml/l, preferably 8-30 ml/l, most preferably 10-25 ml/l. The amount of deionized water depends on the number of hydrolyzable alkoxide groups in the alkoxide or alkoxide mixture used, as well as on the amount necessary for charging of polymeric species by protons.

It has been further found that, when the quantity of the metal alkoxide increases over a definite limit, some turbidity occurs. This limit depends on the properties, particularly, the reactivity and/or the solubility of the metal alkoxide in a given alcoholic solution. However, addition of a very small amount of an inorganic acid and subsequent stirring leads to a transparent solution. The preferred inorganic acid for this purpose is nitric acid, but when the contamination with chlorine ions is not important, hydrochloric acid may be used as well. For example, in the case when titanium isopropoxide was used for the preparation of the charged inorganic-organic polymers solution, the quantity of the nitric acid required was much smaller than the minimum required in order to obtain a clear solution (0.15 mol of nitric acid per mole of alkoxide) if only nitric acid were introduced without the above-mentioned additives (Yoldas, 1986).

The method of the present invention enables to obtain stable transparent sols of polymeric inorganic-organic species charged by protons that are produced by the reaction between the additives: iodine, acetone and water. These inorganic-organic polymeric species repel each other due to their positive surface charge. Under an applied electric field these particles move to the opposite charged electrode, i.e. the cathode. In specific cases (depending on the chemical composition of the polymeric species), an adsorption of iodide anions at the polymeric species surface takes place, instead of protons adsorption. In this case the polymeric species surface is negatively charged, thus during sol-gel EPD the deposition takes place on the anode. The sol-gel EPD was carried out from dilute solutions and under small current density. Under such conditions particles move and deposit slowly (probably individually) forming tight, uniformly packed deposits. Coatings obtained by the method of the present invention are very uniform, homogeneous, adherent, compact and continuous, and create conformal shell on surfaces even of complicated shape.

Thus, in another aspect, the present invention relates to the use of a solution, prepared by the method of the invention, for conformal coating of a substrate by sol-gel EPD.

In a further aspect, the present invention relates to a substrate coated by sol-gel EPD with a solution of inorganic-organic metal alkoxide polymer, prepared by the method of the invention.

By thermal treatment, UV-light irradiation, plasma treatment and/or other related methods, the polymeric inorganic-organic coatings on different substrates can be transformed into metal oxides coatings.

Thus, in another aspect, the present invention relates to a substrate coated with a metal oxide, obtained by thermal treatment, plasma treatment and/or UV-light irradiation of a coated substrate, obtained by sol-gel EPD with a solution of inorganic-organic metal alkoxide polymer, prepared by the method of the invention.

The invention will now be illustrated by the following non-limiting Examples.

EXAMPLES

Example 1

Preparation of $Ti(OiC_3H_7)_4$ Polymer for Sol-Gel EPD of Conformal Coating of Titania 30 mg of iodine, 4 ml of acetone and 2 ml of deionized water were added to 250 ml of ethanol, and the mixture was stirred with magnetic stirrer for 24 h in a closed vessel. Using an inert atmosphere glove box, 3 ml of $Ti(OiC_3H_7)_4$ (tetraisopropyl ortotitanate) were placed in a bottle and hermetically sealed. The sealed bottle was transferred outside the glove box, where under ambient conditions the above-mentioned solution, after cooling to 0-15° C. in an ice bath, was added to the precursor, inside the bottle, under vigorous stirring. The solution was stirred during 24 h resulting in a transparent sol (the color of the sol gradually changed from yellow to colorless). The sol was left for aging in a closed vessel without stirring at ambient conditions for a few days (typically, 4-7 days), after which it was ready for EPD. In a closed vessel under ambient conditions, this sol stays transparent and stable during at least several months.

The sol described above was applied for sol-gel EPD coating of titania nanoporous electrode. The titania nanoporous film was prepared from the commercial titania powder, P-25 (Degussa AG, Germany). The thickness of the film was 11 μm, the substrate area was 20 $cm^2$ and the titania surface area was about 20,000 $cm^2$. The electrophoretic cell contained two electrodes placed vertically at a distance of 54 mm in a suspension of 250 ml. The titania nanoporous electrode on conductive glass served as the cathode and a F-doped-$SnO_2$ conductive glass served as a counter-electrode. The EPD process was performed at room temperature under constant current, using a Keithley 2400 Source Meter as a power supply. The current density was 10 $\mu A/cm^2$ and the sol-gel EPD duration was 2 min. A High Resolution Transmission Electron Microscopy (HRTEM) picture of the coated titania nanoparticles is shown in FIG. 1A.

After drying of the coated electrode first at ambient conditions and then in an oven at 150° C. for 4 h, the fabricated electrode was applied as photoelectrode in dye sensitized solar cell (DSSC). At 1-sun light illumination, the light-to-electricity conversion efficiency for the coated electrode was 4.85%, while the same but uncoated photoelectrode yielded conversion efficiency of only 3.45%.

Example 2

Preparation of $Ti(OiC_3H_7)_4$ and $Al(OsecC_4H_9)_3$ Polymer for Sol-Gel EPD of Conformal Coating of Silver 30 mg of iodine, 5 ml of acetone, 3 ml of deionized water and 5 μl of nitric acid were added to 200 ml of ethanol. The mixture was stirred with magnetic stirrer for 1 h in a closed vessel. Using an inert atmosphere glove box, 2 ml of Ti(OiC$_3$H$_7$)$_4$ and 1 ml of Al(OsecC$_4$H$_9$)$_3$ were placed in a bottle and hermetically sealed. The sealed bottle was transferred outside the glove box, where 50 ml of dry isopropanol were added to the alkoxides mixture, inside the bottle, under vigorous stirring. Once a clear solution was obtained this solution was mixed and vigorously stirred with a solution of iodine, acetone and water in ethanol. The solution was stirred during 24 h, resulting in a transparent sol (the color of the sol gradually changed from yellow to colorless). The sol was left for aging in a closed vessel without stirring at ambient conditions for 7 days, after which it was ready for EPD.

Sol-gel EPD was performed in two-electrode cylindrical electrophoretic cell. A 2 mm diameter silver wire (99.9%, Aldrich) polished, degreased and freed from corrosion products on its surface was placed in the center of the cell and used as cathode. An aluminum foil (99.99%) convoluted to a cylinder with 40 mm diameter was placed in the cell and used as anode. Cathodic current density was 5 µA/cm$^2$ and the sol-gel EPD duration was 1.5 min. The color and shining of the coated silver wire were similar to these of an uncoated reference silver wire. After drying of the coated wire at ambient conditions for 24 h, it was checked for corrosion resistance in a 2% ammonium sulphide solution for 1 min. While uncoated reference silver wire became black after the corrosion test, the color and shining of the silver wire coated by the titania-alumina inorganic-organic polymer were not changed.

Example 3

Preparation of Mg(OC$_2$H$_5$)$_2$ Polymer for Sol-Gel EPD of Conformal Coating of Titania 20 mg of iodine, 3 ml of acetone and 5 µl of nitric acid were added to 250 ml of ethanol. The mixture was stirred with magnetic stirrer for 1 h in a closed vessel. Using an inert atmosphere glove box, 0.3 g of Mg(OC$_2$H$_5$)$_2$ was placed in a bottle and hermetically sealed. The sealed bottle was transferred outside the glove box, where under ambient conditions the above-mentioned solution was added to the precursor, inside the bottle, under vigorous stirring. The solution was sonicated for 30 min using an Ultrasonic Processor VCX-750 (Sonics and Materials, Inc.) in an ice-cooling bath, and then, 1.8 ml of deionized water was added to the solution under vigorous stirring followed by 24 h gentle stirring with magnetic stirrer, resulting in a not quite clear sol, but without a precipitate. The sol was left for aging in a closed vessel without stirring at ambient conditions for 7 days, after which it was purified by centrifugation at 5000-8000 rpm for 3-5 min.

The resulting transparent sol was applied for magnesia polymeric coating of titania nanoporous electrode fabricated from commercially available titania powder P-25 (Degussa AG, Germany). The thickness of the titania nanoporous film after pressing was 8 µm, the substrate area was 20 cm$^2$ and the titania surface area was about 16,000 cm$^2$. Sol-gel EPD from the magnesia solution was performed as described in Example 1, except for the current density that was 25 µA/cm$^2$. The electrode drying was carried out as described in Example 1.

The coated nanoporous electrode was applied as photoelectrode in a dye sensitized solar cell (DSSC). At 1-sun light illumination, the light-to-electricity conversion efficiency for the coated electrode was 6.27% and open circuit voltage ($V_{oc}$) was 785 mV, while the same but uncoated photoelectrode yielded conversion efficiency of only 5.5% with $V_{oc}$ of 765 mV.

REFERENCES

Kallala, M. Sanchez, C. Cabane, B., SAXS Study of Gelation and Precipitation in Titanium-Based Systems, *J. Non-Cryst. Solids,* 1992, 147-148, 189-193

Koura, N. Tsukamoto, T. Shoji, H. Hotta, T., Preparation of various oxide films by an electrophoretic deposition method: a study of the mechanism, *Jpn. J. Appl. Phys.,* 1995, 34, 1643-1647

Livage, J. Henry, M. Sanchez, C., Sol-gel chemistry of transition metal oxides, *Prog. Solid State Chem.,* 1988, 18, 259-341

Sanchez, C. Ribot, F., Design of hybrid organic-inorganic materials synthesized via sol-gel chemistry, *New J. Chem.,* 1994, 18, 1007-1047

Sarkar, P. Nicholson, P. S., Electrophoretic deposition (EPD): mechanisms, kinetics, and applications to ceramics, *J. Am. Ceram. Soc.,* 1996, 79, 1897-2002

Yoldas, B. E., Hydrolysis of titanium alkoxide and effects of hydrolytic polycondensation parameters, *J. Mater. Sci.,* 1986, 21, 1087-1092

Zhitomirsky, I., Cathodic electrodeposition of ceramic and organoceramic materials. Fundamental aspects, *Advances in Colloid and Interface Science,* 2002, 97, 279-317

The invention claimed is:

1. A method for the preparation of a stable solution of charged inorganic-organic polymers, comprising polymerization of at least one metal alkoxide by sol-gel technology in the presence of a condensation inhibitor that forms H$^+$ions, wherein said inhibitor consists of an alcoholic solution of the additives iodine, acetone and water.

2. The method of claim 1, wherein the metal alkoxide is an alkoxide of a metal selected from a lanthanide metal such as Ce, Pr, Nd, Pm, Sm, Eu, Gd, Tb, Dy, Ho, Er, Tm, Yb or Lu, a transition metal such as Sc, Ti, V, Cr, Mn, Fe, Co, Ni, Cu or Zn, an alkaline earth metal such as Be, Mg, Ca, Sr or Ba, an alkaline metal such as Li, Na, K, Rb or Cs, Al, or such an element as B, Si or P, and a $C_1$-$C_{10}$, preferably $C_1$-$C_6$, straight or branched alkanol.

3. The method of claim 2, wherein said metal alkoxide is selected from Ti(OiC$_3$H$_7$)$_4$, Al(OsecC$_4$H$_9$)$_3$, Mg(OC$_2$H$_5$)$_2$ and mixtures thereof.

4. The method of claim 1, wherein said alcoholic solution is composed of ethanol, isopropanol, isobutanol or mixtures thereof.

5. The method of claim 4, wherein said alcoholic solution is an ethanolic solution.

6. The method of claim 1, wherein an inorganic acid is added to the alcoholic solution containing the additives.

7. The method of claim 6, wherein said inorganic acid is nitric acid or hydrochloric acid.

8. In a method for conformal coating of a substrate by sol-gel electrophoretic deposition (EPD), the improvement consisting in applying a solution of charged inorganic-organic polymer obtained by the method of claim 1.

9. A substrate coated by sol-gel EPD with a solution of inorganic-organic metal alkoxide polymer according to claim 1.

10. A substrate coated with a metal oxide obtained by thermal treatment, plasma treatment and/or UV-light irradiation of a coated substrate according to claim 9.

* * * * *